Patented Sept. 14, 1948

2,449,346

UNITED STATES PATENT OFFICE 2,449,346

SILICATE PAINTS

Wesley G. Vannoy, Wilmington, Del., assignor to E. I. du Pont de Nemours & Company, Wilmington, Del., a corporation of Delaware No Drawing. Application January 5, 1945,
Serial No. 571,534

4 Claims. (Cl. 106—84)

This invention relates to alkali metal silicate paints and more particularly to improvement in quality of such paints.

Solutions of alkali metal silicates, especially aqueous solutions of waterglass or sodium silicate are commonly used as vehicle and binding medium in protective coating compositions. These water paints containing a soluble silicate are inexpensive, and the film deposited by evaporation of the water content is peculiarly well-adapted to the coating of certain surfaces, such as brick and plaster, asbestos composition boards, etc. Unlike oil paints, these water and mineral paints are uninflammable and so are desirable for coating organic fibre wall board and other such burnable materials exposed to high fire risk.

The film deposited by an aqueous-silicate paint will vary in physical properties according to the ratio of alkali metal oxide and silica in the silicate itself, as well as in accord with the amount and nature of other materials added to give hiding power, color, plasticity, smoothness of flow, durability, etc. Sodium silicate paints without added pigments have no hiding power but this defect can be remedied by addition of one or more of the pigments commonly used in oil paints. Lithopone, white lead, and titanium oxide are available for the purpose, but zinc oxide, another well-known pigment, is considered to be too reactive with alkali metal silicates. Of the more desirable pigments for use in silicate-water paints, titanium oxide, especially in the form of the rutile pigment, has the greatest hiding power per unit weight of pigment and is outstandingly inert in all sorts of paint compositions. Because of the great hiding power of titanium oxide pigments, less has to be used and the paint film consequently retains to a greater degree the noncracking property of an unpigmented alkali metal silicate film. Although the use of high hiding power pigments such as rutile titanium oxide is a step toward improving the quality of silicate paint films, further improvement is necessary before unquestioning acceptance of such paints by the trade is to be expected.

It is an object of this invention to eliminate the still remaining although lessened tendency of a silicate paint film to crack on aging. A further object is production of a silicate paint film which is not objectionably brittle and which compares favorably in appearances with films from good oil paints. A still further object is to provide a high quality water paint comprising a water-soluble binder which when applied as a film and dried gives a water-resisting coating. Further objects will appear hereinafter.

These objects are accomplished by the following invention wherein an improved aqueous silicate-paint is provided comprising as essential materials, water, potassium silicate, titanium dioxide, and micaceous silicate. Other ingredients such as sugar, copper amino sulfate, coloring materials, and various wetting agents may be added for their particular effects on the quality of the paint. The titanium oxide used is preferably rutile, it being available in very fine particle size with high hiding power, but satisfactory results may be obtained with anatase titanium oxide pigment. Mica, another of the essential insoluble ingredients may be obtained in the trade in finely divided form for use in paints and other industrial products. The finely divided mica sold under the trade name "Mineralite" 3X is a suitable material for my product but presumably other brands of pulverized mica on the market are equally satisfactory. This ingredient is a flake type extender and with potassium silicate gives a film on drying which is continuous and without tendency to crack. The potassium silicate which I employ is a commercial product and can be purchased in solutions of various strengths and various proportions of potassium oxide to silicon dioxide. I prefer to use a product containing one part of potassium oxide to 2.5–3.5 parts of silicon dioxide.

As mentioned above, copper amino sulfate may be added to increase the water resistance of the dried film. Other salts of this type, such as the cadmium and zinc amino salts, may be used instead. Other insolubilizing agents may be used in the composition and these include acidic materials such as tartaric acid, boric acid, etc. On drying, the amino salts appear to break down, giving off ammonia and forming insoluble silicates. The acidic materials also assist in insolubilizing the silica compound and the water resistance is likewise increased.

A wetting compound in small amount may be added to give the composition improved flow and adhesion properties. Sulfonated petroleum products are excellent wetting agents for this purpose. "Alkonal" WXN is marketed by the Du Pont Company, and is a sodium salt of a sulphonated petroleum fraction. Naturally, the water content of the composition may be varied as desired to obtain the best brushing consistency.

An organic plasticizing agent may be added to give better endurance of the paint film under particularly severe conditions of wear and exposure.

Having described the process and product of my invention in a general way, I now submit a specific example to show the advantage of mica, in my paint composition. The paint compositions which follow were prepared in a pebble mill. The figures represent pounds of ingredients per gallon of paint.

Example

| Composition | Silicate paint | |
|---|---|---|
| | A | B |
| Rutile Titanium Dioxide | 4.72 | 1.90 |
| Mica | | 1.90 |
| Potassium Silicate (1 mol K$^2$O to 3.25 mols SiO$_2$) | 4.57 | 4.57 |
| Water | 3.66 | 3.66 |
| Sugar | .2280 | .2280 |
| Copper Amino Sulphate | .2055 | .2055 |
| Wetting Agent | .0228 | .0228 |
| Lbs. per gallon | 13.4063 | 12.4863 |

Before adding the ingredients to the pebble mill the copper amino sulfate crystals were dissolved in water and while the solution was under strong agitation the potassium silicate solution was added. This mixture was then placed in the pebble mill and the other ingredients added. The mill was then closed and grinding was continued for three hours.

Each of the two compositions (A and B) after removal from the pebble mill were suitable for coating composition work but the quality of the films differed greatly. Paint A contained only titanium dioxide while paint B contained an equal volume of pigmenting material with a portion of the titanium dioxide replaced by an amount of mica to give the same volume of solids as that contained in paint A. The two paints were brushed on edge grained white pine panels and aged. The aged panels show that paint B remained a continuous unbroken film after several months, while paint A, which was not made according to this invention, showed small cracks under the same conditions of aging.

The use of mica in combination with potassium silicate is an essential feature of this invention. Sodium silicate with mica does not give the desired results, even though crack resistance is improved. The films are less water resistant, respond less favorably when insolubilizing agents are used and invariably show definite efflorescing tendencies. It is thought that the potassium silicate adheres more strongly to the mica surfaces and in that way causes the superior results obtained with its use instead of sodium silicate. The potassium silicate ingredient may be purchased as a syrupy solution in which condition it is added in the paint mixing operation. I find it best to use two to three pounds of syrupy potassium silicate solution containing approximately 39% by wt. of potassium silicate, per pound of mica. The potassium oxide—silicon dioxide ratio may vary considerably but the best results are obtained when the silicate contains 2.5 to 4.2 mols of SiO$_2$ per mol of K$_2$O. The titanium dioxide may vary from one to three pounds per gallon with a preferred amount of from 1.5 to 2 pounds per gallon.

In the example given above the paints were prepared in a pebble mill but it is obvious that the paints may be ground in stone or roller mills. In such cases a portion of the vehicle and/or water is held back to be added later in order to give a good grinding base.

The silicate paint prepared in accordance with this invention is particularly useful for the decoration of masonry surfaces. It has been favorably received as a coating composition for asbestos products as it adheres to these surfaces well, gives excellent durability over long periods of time, and is cheaper than paints containing organic binders. My paint is also suitable for the coating of plaster, brick, and wall board, and it is in these fields that it shows its greatest value. Basement walls have remained attractive in appearance and without showing any failure for a two years period and it seems that such surfaces will continue to be satisfactory for a much longer period. It may be added that there is no yellowing of the film, such as is often encountered with paints containing organic binders.

The utility of this invention is well demonstrated when colored titanium pigments are used as the prime pigmenting material in the silicate compositions. Such colored pigments are disclosed in U. S. Patents Re. 21,427, 2,226,142, 2,231,455, 2,231,456 and 2,257,278, and they have been found to give very stable and durable films when used along with mica in an aqueous vehicle comprising potassium silicate.

As many apparently widely different embodiments of this invention may be made without departing from the spirit and scope thereof, it is to be understood that the invention is not limited to the specific embodiments thereof except as defined in the appended claims.

I claim:

1. A paint composition comprising a metal amino sulfate from the group consisting of copper, cadmium, and zinc amino sulfates, titanium oxide in powder form, finely divided mica, potassium silicate and water.

2. A paint composition comprising copper amino sulfate, rutile titanium oxide in powder form, finely divided mica, potassium silicate and water.

3. A paint composition comprising copper amino sulfate, rutile titanium oxide in powder form and substantially the same amount by weight of finely divided mica as pigment, and an aqueous solution of potassium silicate.

4. A paint composition comprising copper amino sulfate, substantially equal proportions of rutile titanium oxide and mica in finely divided forms, water, and potassium silicate having a ratio of one molecular weight of potassium oxide to 2.5 to 4.2 molecular weights of silicon dioxide.

WESLEY G. VANNOY.

REFERENCES CITED

The following references are of record in the file of this patent:

UNITED STATES PATENTS

| Number | Name | Date |
|---|---|---|
| 421,229 | Bibikov | Feb. 11, 1890 |
| 2,084,486 | Flood et al. | June 22, 1937 |
| 2,372,285 | Marc | Mar. 27, 1945 |

FOREIGN PATENTS

| Number | Country | Date |
|---|---|---|
| 489,464 | Great Britain | 1938 |
| 502,044 | Great Britain | 1939 |
| 757,699 | France | 1933 |

OTHER REFERENCES

"Silicate P's and Q's," The Philadelphia Quartz Co., vol. 23, No. 8, 1943.